May 1, 1923.
H. R. WESTWELL
ADJUSTABLE BEARING CAP
Filed Nov. 28, 1921
1,453,962
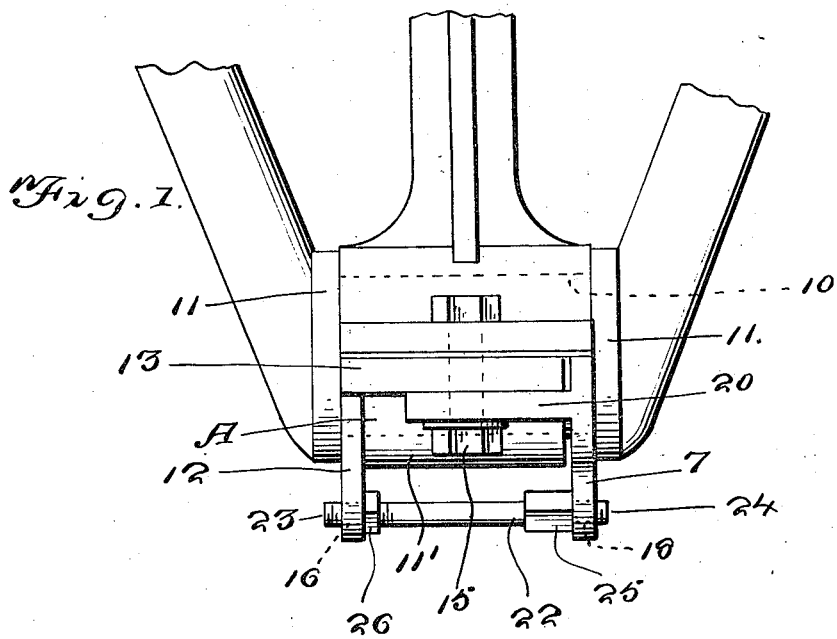
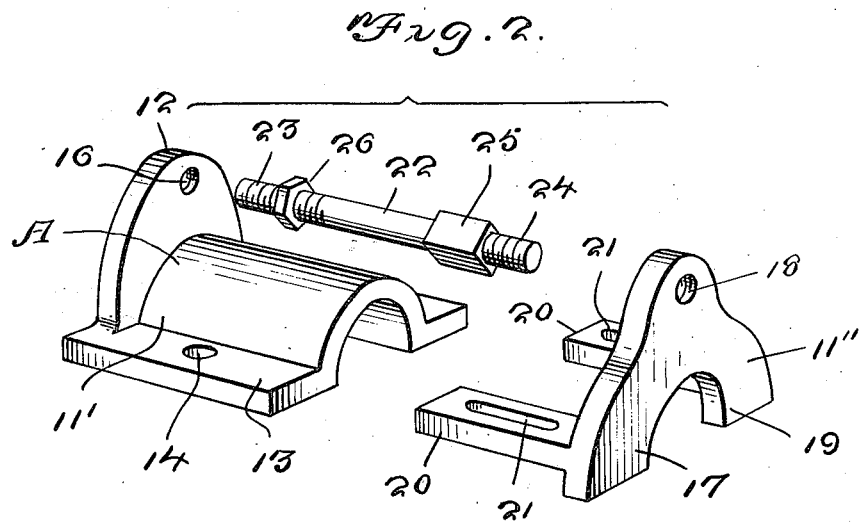
H. R. Westwell
INVENTOR
BY Victor J. Evans
ATTORNEY
WITNESS:

Patented May 1, 1923.

1,453,962

UNITED STATES PATENT OFFICE.

HERBERT R. WESTWELL, OF METHUEN, MASSACHUSETTS.

ADJUSTABLE BEARING CAP.

Application filed November 28, 1921. Serial No. 518,268.

*To all whom it may concern:*

Be it known that I, HERBERT R. WESTWELL, a citizen of the United States, residing at Methuen, in the county of Essex and State of Massachusetts, have invented new and useful Improvements in Adjustable Bearing Caps, of which the following is a specification.

This invention comprehends the provision of an extension cap for shaft bearings, to prevent end-play in the shaft where the bearing is arranged between flanges or shoulders.

The chief characteristic of the present invention resides in the provision of a cap of the above mentioned character which is made up of two parts, one of which is susceptible of adjustment toward and away from the other, with means for holding the said parts fixed relatively for the purpose stated.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a view, showing the invention associated with a shaft.

Figure 2 is a perspective view of the invention showing the component parts separated.

Referring to the drawing in detail, 10 indicates the shaft between the collars or flanges 11 of which the bearing is arranged, and the cap of the bearing is indicated generally at A. The cap embodies two parts, one of which is indicated at 11' and is of usual construction except that it is provided with a flange or wall 12 at one end thereof. The attaching flanges of this part of the cap are indicated at 13 and provided with openings 14 for the reception of suitable fastening elements 15. The flange or wall 12 is provided with a threaded bore 16 for a purpose to be presently described. The part 11" of the cap includes a body portion 17 which is arranged in spaced relation to the wall 12, and is provided with a threaded opening 18 arranged in axial alinement with the opening 16 of the wall 12.

The part 11" is cut away as at 19 to accommodate the shaft 10. Projecting from one side of the portion 17, and at opposite sides of the cut away portion 19, are parallel extensions 20 each of which is slotted as at 21. These extensions are arranged to be positioned beneath the attaching flanges 13, and the fastening elements 15 passed through the slots 21. By reason of this construction, the portion 17 is susceptible of adjustment toward and away from the member 11' to prevent endwise movement of the shaft 10 between the collars 11. The portion 17 is not only held fixed relative to the member 11' by means of the fastening elements 15, but is also held against movement by connecting bar 22 which has its terminals 23 and 24 respectively threaded in opposite directions, the former being received by the opening 16 in the wall 12 of the member 11', while the terminal 24 is received by an opening 18 of the portion 17. The connecting bars are formed with a head or shoulder 25 which bears against the portion 17, while a lock nut 26 is associated with the terminal 23 of said bar. Manifestly, the body portion or movable member 17 is effectively held against possible derangement on the shaft, or with respect to the member 11', after it has been adjusted for the purpose specified.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

An extension cap for bearings of the character described comprising two parts, apertured attaching flanges formed on one of said parts, a wall rising from said part at one end thereof, and having a threaded opening, the other of said parts having a threaded opening arranged in a line with the first mentioned opening, slotted extensions projecting from the second part and arranged beneath said flanges, fastening elements adapted to be passed through said openings and slots of the respective parts, an attaching bar having oppositely threaded extremities received by the threaded openings of said respective parts, and a lock nut associated with one of said extremities as and for the purpose specified.

In testimony whereof I affix my signature.

HERBERT R. WESTWELL.